United States Patent [19]

Keith

[11] 4,384,512
[45] May 24, 1983

[54] BEVERAGE HEATER AND COOLER

[76] Inventor: Glenn R. Keith, 3107 Ave. T, Apt. A, Ft. Pierce, Fla. 33450

[21] Appl. No.: 262,608

[22] Filed: May 11, 1981

[51] Int. Cl.³ .......................................... A47J 31/053
[52] U.S. Cl. .......................................... 99/308; 62/3; 99/281; 99/316; 222/146 R
[58] Field of Search ............. 99/280, 281, 282, 302 R, 99/302 P, 307, 308, 309, 310, 313, 314, 316; 62/3; 222/146 R, 135, 136

[56] References Cited

U.S. PATENT DOCUMENTS

| | | | |
|---|---|---|---|
| 2,626,558 | 1/1953 | Stein | 99/302 R |
| 3,315,474 | 4/1967 | Farer | 62/3 |
| 3,586,099 | 6/1971 | Collie | 165/48 |
| 3,669,314 | 6/1972 | Goings | 222/136 |
| 3,955,713 | 5/1976 | Hurley | 222/129.4 |
| 4,140,150 | 2/1979 | Rundell | 137/340 |
| 4,242,874 | 1/1981 | Simms | 62/3 |
| 4,297,849 | 11/1981 | Buffet | 62/3 |
| 4,311,017 | 1/1982 | Reed | 62/3 |

Primary Examiner—Robert W. Jenkins
Attorney, Agent, or Firm—Howard I. Podell

[57] ABSTRACT

A unit for independently storing liquids and heating and cooling in separate liquid containers that is adaptable for mounting in a vehicle, and preferably shaped to fit over the transmission hump of a vehicle floor. The heating and/or cooling means is a separate thermoelectric junction unit mounted to each container and powered by the electric supply of a built-in battery of the vehicle. The spigot of each container is connected to the outlet of a separate pump so that the spigot may be located above the bottom of the container. The thermoelectric junction of two tanks may be connected so that the passage of electricity through the connected junctions serves to cool one tank and heat the other. Alternatively, each junction may be fitted with a separate heat sink or cold sink.

4 Claims, 9 Drawing Figures

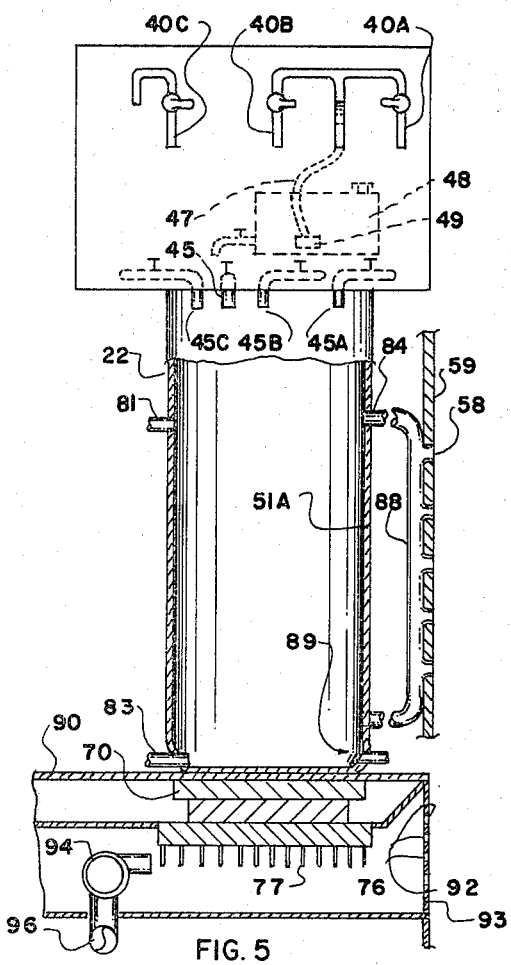
FIG. 5
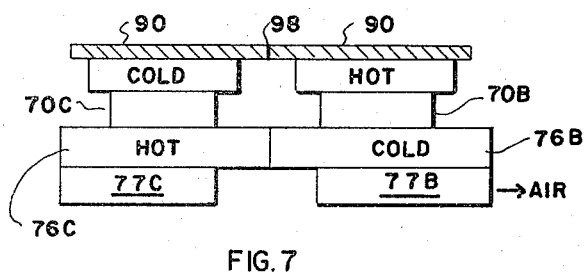
FIG. 7
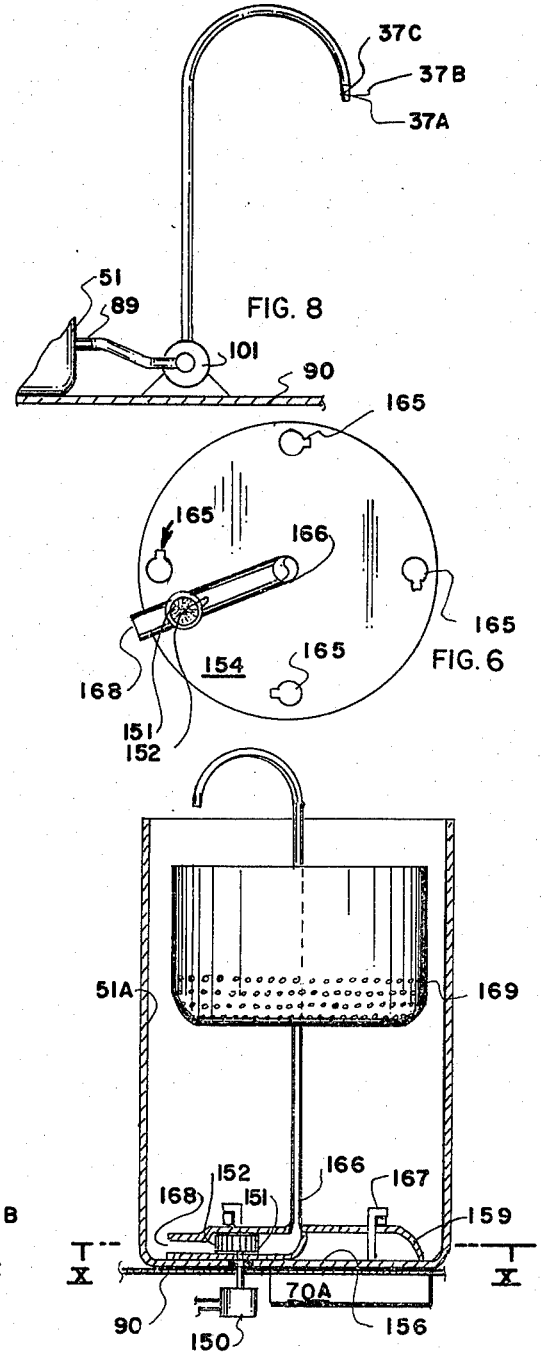
FIG. 8
FIG. 6
FIG. 9 ct # BEVERAGE HEATER AND COOLER

BACKGROUND OF THE INVENTION

Various types of equipment have been disclosed for use in the storage and dispensing of heated and cooled liquids in a vehicle. Such prior inventions are disclosed in the following U.S. Pat. Nos. 4,140,150; 3,586,099; 4,055,279; 3,912,475; 3,955,713; 4,034,571; 3,692,975; and 3,669,314.

In particular, U.S. Pat. No. 4,055,279 shows a vehicle beverage dispenser that pumps both cold and hot liquid using heat exchange coils and may be mounted over the transmission hump. U.S. Pat. Nos. 3,669,314 and 4,140,150 also show vehicle dispensers that produce both hot and cold liquids, using heat exchangers.

However, none of these inventions suggest the effectiveness and utility of the applicant's dispenser as described herewith.

SUMMARY OF THE INVENTION

My invention is a unit for independently storing liquids and heating and cooling in separate liquid containers that is adaptable for mounting in a vehicle, and preferably shaped to fit over the transmission hump of a vehicle floor. The heating and/or cooling means is a separate thermoelectric junction unit mounted to each container and powered by the electric supply of a built-in battery of the vehicle. The spigot of each container is connected to the outlet of a separate pump so that the spigot may be located above the bottom of the container. The thermoelectric junction of two tanks may be connected so that the passage of electricity through the connected junctions serves to cool one tank and heat the other. Alternatively, each junction may be fitted with a separate heat sink or cold sink.

BRIEF DESCRIPTION OF THE DRAWINGS

The objects and features of the invention may be understood with reference to the following detailed description of an illustrative embodiment of the invention, taken together with the accompanying drawings in which:

FIG. 5 is a rear elevation view of the invention;

FIG. 6 is a plan view taken along line 10—10 of FIG. 9.

FIG. 7 is a detail sectional view of a pair of adjacent thermoelectric modules;

FIG. 8 is a detail schematic view of the outlet pump of a vessel;

FIG. 9 is a sectional view of a vessel fitted with a percolating unit.

DESCRIPTION OF THE PREFERRED EMBODIMENT

Figure 1:
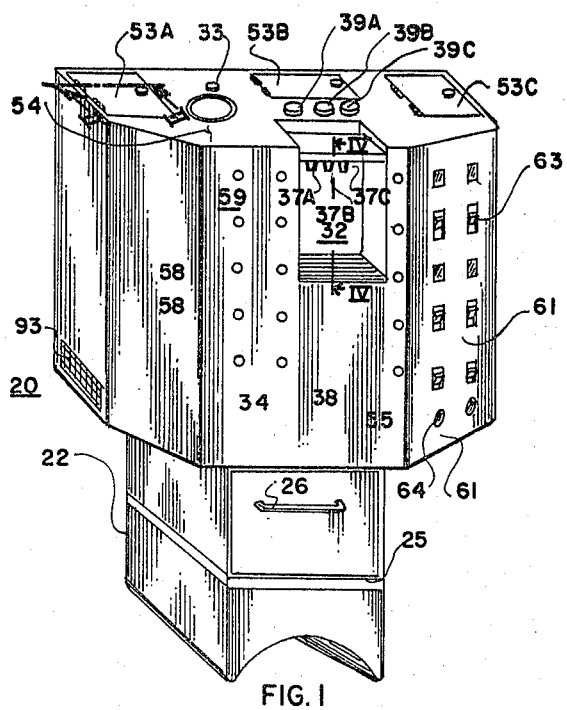
FIG. 1 is a perspective view of the invention.

Turning now descriptively to the drawings, in which similar reference characters denote similar elements throughout the several views, FIG. 1 is a perspective view of the invention in the form of a console 20 which is formed with a base section 22 shaped with a concave bottom wall 24 of a size to engage about the transmission hump of the rear floor 27 of conventional automobiles. A slidable drawer 25 is mounted in base section 24 for storage of supplies, with drawer pull 26 extending from the drawer.

Figure 4:
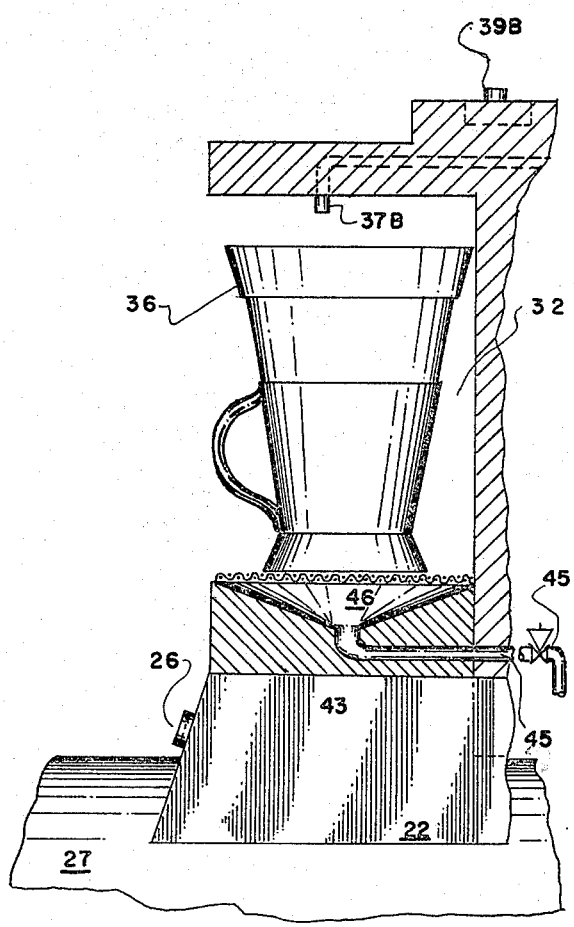
FIG. 4 is a side sectional detail view taken along line 4—4 of FIG. 1.

A recessed chamber 32 is open to the front face 34 of the console. Spigots 37A, 37B, 37C extend from the top wall 39 of the chamber 32 and an open grill 38 serves as the bottom wall of the chamber 32, with chamber 32 of a size to freely contain a serving cup, 36 as shown in FIG. 4 into which a beverage may be dispensed from a spigot 37A–37C which is controlled by an individual actuator 39A–39C of a respective momentary electric switch. A drain chamber 41 below open grill 38 leads through tube 43 to a drain faucet outlet 45 in the rear of the console.

Figure 2:
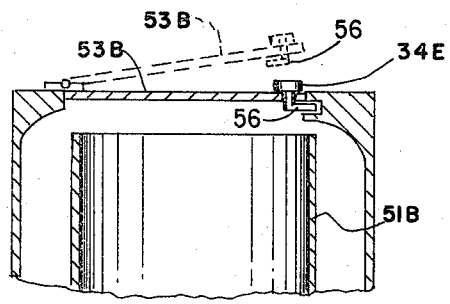
FIG. 2 is a detail sectional view of the invention taken along line 2—2 of FIG. 1.

Each of the three individual vessels 51A, 51B, 51C are located in the interior of the console and located directly below a respective cover 53A, 53B, 53C hinged to the top wall 54 of the console and locked in the closed position by a rotatable latch 56. When the cover is opened, as shown in the dash lines of FIG. 2, the vessel may be manually filled or cleaned, as desired.

A plurality of sight windows 58 are fixed in the front face 59 of the console, with each window located to enable the use to locate the height of liquid in a specific vessel 51 as indicated on a level gauge linked to the specific vessel 51.

Switches 63 and switch buttons 64 are located on a front diagonal face 61 of the console as hereinafter described.

Figure 3:
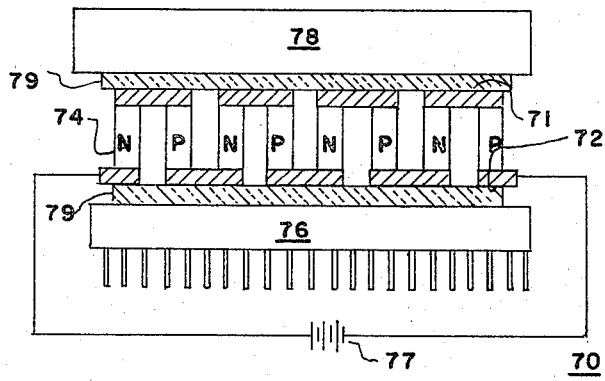
FIG. 3 is a sectional view of a thermoelectric module.

FIG. 3 illustrates a conventional thermoelectric module assembly 70 employed for cooling purposes.

Such a thermoelectric module unit 70 does not actually absorb heat, but rather, pumps heat through the module from one surface 71 to the other, 72. The heat pumped in watts ($Q_c$) plus the electrical input power (P) to the module 74 must be removed from the module by some means, thus dictating the need for a suitable heat sink 76. The total heat flowing into the heat sink from the module ($Q_h$) can be expressed by the equation:

$$Q_h = P + Q_c$$

A heat sink is considered to be an integral part of any thermoelectric cooling system and heat sink performance must be taken into consideration for all system designs.

An ideal heat sink would be capable of absorbing an infinite amount of heat without rising in temperature. Since this is not possible in the practical case, a heat sink must be selected which will absorb the total waste heat from the TEDs and not rise in temperature above a tolerable level.

As shown in FIG. 3, the module is tightly fixed between a heat sink 76 and the object 78 to be cooled. Electric current from a battery, 77 is passed through semi-conductors N, P located between the opposed faces 71, 72 of the module. Such heat sinks may be employed as heating means, with the heat sink employed to bring heat into the module 74 by reversal of the surfaces of the module, fixed between the object to be cooled (heated) and the heat sink which is heated (cooled) respectively. Thermoelectric modules may be purchased from existing sources such as The Materials Electronic Products Corporation of Trenton, N. J. The module 74 is spaced from the heat sink and body to be cooled by layers 79 of electrical insulation.

Temperatures differential of up to 75° C. may be maintained, with electrical current flowing in the module, between the hot face and the cold face of the module, with the hot face temperature exceeding 50° C. and cold face temperature being less than 0° C.

As shown in FIG. 5, a drain faucet spigot 45A, 45B and 45C each extends externally from the bottom of each vessel 51 in the console. Filler spigots 40A, 40B, 40C each extend externally from the upper section of each vessel. As shown in FIG. 5, a refill water tank 48 may be externally mounted and an electric pump 49 may be mounted inside of tank 48 with its outlet joined to a tube 47 leading to refill spigots so that refill water may be pumped into a vessel 51. Alternatively, in the case of a fixed installation in a building, each filler spigot may be connected to a supply of hot or cold water, as desired, by fixed tubing; a mobile unit may be removed from a vehicle and joined by flexible tubing to hot or cold water supply leading to each of the filler spigots.

As shown in FIG. 7, each vessel 51A, 51B, 51C rests on a bottom wall section 90 of the console inside the console. The vessel is fitted with outlet tubes 81, 83 for joining by flexible tubing to respective inlet and drain spigots. An upper and lower outlet tubes 84, 89 are each joined by flexible tubing to the opposed openings of the level sight tube 88. An outlet tube 89 is connected by flexible tubing to an individual outlet pump 101, as shown in FIG. 8 which is controlled by a switch 63, with the outlet of pump 101 joined to a respective dispenser spigot 37A, or 37B, or 37C.

An individual thermoelectric module assembly 70 is fixed against the external face of bottom wall 90 below each vessel and electrically connected so as to heat or cool the bottom wall section adjacent to the vessel. The bottom wall sections 90 below each vessel may be joined together by heat insulating joints 98 so that one vessel may be heated and an adjacent vessel cooled by adjacent respective modules 70. Fins 77 extend from the heat sink of the thermoelectric assembly into a ventilating chamber 92 in the base of the console. An air blower fan 94 is fitted with an external air inlet 96 and blows air at ambient temperature through the ventilating chamber and out through grill 93. At least one of the heat sinks 76C will be above ambient temperature where the respective thermoelectric module 70C is serving to cool the respective vessel 51C, while others will be below ambient temperature where the respective module such as 70B is serving to heat the vessel 51B. Consequently the internal air circulation across the heat sink fins 77C and 77B will serve to cause heat flow between the heat sinks maintains all heat sinks at optimum temperatures. Where one module 70C is employed for cooling and located adjacent another module 70B employed for heating, the respective heat sinks 76C and 76B may be physically joined to improve the effectiveness of such heat sink, by providing a common heat sink that transfers the heat removed from the cooling vessel 51C to the heating vessel 51B. The flow of air circulated by blower 94 about the fins 77 of the heat sinks serves also to transfer heat between the respective hot and cold heat sinks as well as to transfer hot heat between the heat sinks and the ambient air.

FIGS. 9–10 illustrate the percolater unit of the coffee vessel 51A which is suitable for preparation of coffee from water which is heated to below the boiling point so as to eliminate the need for excessive heat buildup by the thermoelectric module 70A.

A perforated filter cup 169 for containment of ground coffee is supported on vertical feed tube 166. A pump 151 driven by motor 150 located below the floor section 90 draws water into a pump chamber 152 in the bottom of the vessel. Pump 151 is joined by a shaft through a water-tight bearing in the bottom of vessel 169 to motor 150. Chamber 152 is enclosed by removable shaped base plate 154. Shaped holes 165 in the plate 154 are detachably engaged by shaped hook fasteners 167 extending from the bottom 156 of vessel 51A. With pump 151 driven by motor 150 heated water in vessel 51A is drawn into pump inlet 168 and forced up tube 166 to spill into the filter cup so as to mix with the coffee grounds and drip through the cup perforations back into the vessel. The entire assembly of filter cup, vertical tube 166, base plate 154 and the housing of the pump chamber is readily removable by slight manual clockwise rotation of base plate 154 after the coffee has been sufficiently percolated.

Since obvious changes may be made in the specific embodiment of the invention described herein, such modifications being within the spirit and scope of the invention claimed, it is indicated that all matter container herein is intended as illustrative and not as limiting in scope.

Having thus described the invention, what I claim as new and desire to secure by Letters Patent of the United States is:

1. Assembly for storing and dispensing beverages in a vehicle, comprising
 a console formed with a base section shaped with a concave bottom wall adapted to engage the transmission hump on the floor of said vehicle to secure said assembly thereon;
 a recessed chamber in the front of said console;
 a plurality of spigots issuing in said chamber;
 a drain chamber at the bottom of said chamber;
 a plurality of beverage containers in said console connected to said spigots;
 a thermoelectric module in each container, and heat sinks;
 heat insulating means between said modules so that one container may be heated and the adjacent container may be cooled by adjacent modules;
 a ventilating chamber in the base of said console communicating with said drain chamber;
 said heat sinks having fins extending into said ventilating chamber,
 a fan in said ventilating chamber for blowing ambient air across said fins to maintain said heat sinks at optimum temperatures.

2. The assembly of claim 1, wherein one of said modules is employed for cooling and an adjacent module is employed for heating, with each module joined to a respective heat sink, and with both said heat sinks physically joined so as to conduct heat from the heat sink of the cooling module to the heat sink of the heating module.

3. The assembly of claim 1, further including a water tank and pump means for pumping water into said containers.

4. The assembly of claim 1, wherein a pump is mounted to circulate a liquid in one of said containers and through a filter cup mounted in the upper part of said container; said cup being adapted to contain coffee grounds;
 said pump providing coffee percolating means to circulate liquid in said container through said cup at a temperature below the boiling point of said liquid.

* * * * *